United States Patent

Marcus

[15] 3,700,819

[45] Oct. 24, 1972

[54] TIME DIVISION SWITCHING SYSTEM WITH TIME SLOT INTERCHANGE

[72] Inventor: Michael Jay Marcus, Cambridge, Mass.

[73] Assignee: Bell Telephone Laboratories, Incorporated, Berkeley Heights, N.J.

[22] Filed: Dec. 7, 1970

[21] Appl. No.: 95,706

[52] U.S. Cl. ..........179/15 AQ, 179/18 GF, 179/18 J

[51] Int. Cl. ..........H04j 3/00

[58] Field of Search 179/15 AQ, 18 FC, 18 GF, 18 J, 179/18 ES

[56] References Cited

UNITED STATES PATENTS

| | | | |
|---|---|---|---|
| 3,573,381 | 4/1971 | Marcus | 179/15 AQ |
| 3,461,242 | 8/1969 | Inose | 179/15 AQ |
| 3,236,951 | 2/1966 | Yamamoto | 179/15 AQ |
| 3,217,106 | 11/1965 | Muroga | 179/15 AQ |
| 2,476,066 | 7/1949 | Rochester | 179/18 GF |
| 2,965,887 | 12/1960 | Yostpille | 178/50 |
| 3,124,655 | 3/1964 | Feiner | 179/18 FC |
| 3,458,659 | 7/1969 | Sterning | 179/15 AQ |

*Primary Examiner*—Kathleen H. Claffy
*Assistant Examiner*—David L. Stewart
*Attorney*—R. J. Guenther and William L. Keefauver

[57] ABSTRACT

A multistage network for permuting an input sequence of signals is described. Typically, this sequence corresponds to time division multiplexed communication signals. The overall permuting is accomplished by partially permuting the signals at each stage of selectively delaying these signals in accordance with stored control information. Techniques are described for deriving the required control information and a number of alternate embodiments for the delay circuitry are presented.

21 Claims, 21 Drawing Figures

INVENTOR
M. J. MARCUS
BY William Ryan
ATTORNEY

TIME DIVISION SWITCHING SYSTEM WITH TIME SLOT INTERCHANGE

BACKGROUND OF THE INVENTION

The current practice in telephone systems generally is to establish a solid connection between a calling line and a called line via a path which is associated individually and uninterruptedly with the connection for the duration of the call. Thus a quantity of equipment dependent upon the number of lines served and the expected frequency of service, is provided in a common pool from which portions may be chosen and assigned to a particular call. Such an arrangement is referred to as "space division" in which the privacy of each conversation is assured by the division or separation of individual conversations in space.

In contrast, telephone systems have been developed which operate on a time division basis in which a number of conversations share a single communication highway. Privacy of conversation is assured in such systems by the division or separation of individual conversations in time. Thus each conversation is assigned to the common highway for an extremely short, periodically recurring interval, and the connection between any two lines in communication is completed only during the assigned interval or time channel. Samples which retain essential characteristics of the voice or other signal are transmitted over the common highway in these time channels and are utilized in the called line to reconstruct the original signal.

A critical problem is presented in both space and time division systems when one or more stages of switching are interposed between the calling and called lines. This problem is termed "blocking" and arises when a portion of the switched path is not available for assignment to a potential connection.

Space division networks minimize the blocking problem primarily through redundancy of available network paths which, of course, is expensive. Time division networks treat the problem of interchanging the time channels assigned to particular call connections in various stages of the network. This is accomplished by incorporating delay in the common highways or intermediate the switching elements. Thus a conversation transmitted in one time channel on a first highway may be shifted to different channels in successive highways to which it is switched enroute to its destination. Collectively these techniques have come to be known as those for time slot interchanging.

In general, time slot interchanging has been accomplished by selectively introducing delay in the path of signals arriving in given time slots so that upon exiting the switching system they appear in different time slots. Such techniques are described, for example, in U.S. Pat. Nos. 3,172,956 and 3,446,917 issued to H. Inose et al. on Mar. 9, 1965 and Mar. 27, 1969, respectively, and in H. Inose et al., "A Time Slot Interchange System in Time-Division Electronic Exchanges," IEEE Trans., vol. CS-11, p. 336 (Sept. 1963); C. Y. Lee, "Analysis of Switching Networks," B.S.T.J., vol. 34, p. 1,287 (Nov. 1955); and copending U.S. Pat. application by M. J. Marcus, Ser. No. 810,618, filed Mar. 26, 1969 now U.S. Pat. No. 3,573,381, issued Apr. 6, 1971.

SUMMARY OF THE INVENTION

While time division techniques in general reduce the complexity of apparatus required to selectively connect a first group of lines to a second group of lines, as compared with space division multiplex systems of equal capacity, the prior art time division techniques mentioned above nevertheless often impose stringent operational characteristics, including speed of operation of components and precise synchronization among these components. The present invention overcomes many of the limitations of the prior art time slot interchangers while further reducing complexity by recognizing a fundamental similarity in time division and space division switching theories and technologies.

Briefly stated, the present invention provides a time division multiplex network comprising a plurality of cascaded stages which network can interchange the time slot corresponding to any given input node to the time slot corresponding to any desired output node. Each of the stages of the network comprises means for permuting the stream of input signals in accordance with stored data partially representative of the desired time slot interchange. This permuting is accomplished partially in each of the plurality of stages of the network. A reduced amount of memory is required to control the flow of information through the various network paths to effect the desired interchange.

BRIEF DESCRIPTION OF THE DRAWINGS

The present invention will be more fully understood from the detailed description given below in connection with the attached drawing wherein.

DETAILED DESCRIPTION

Figure 1A:
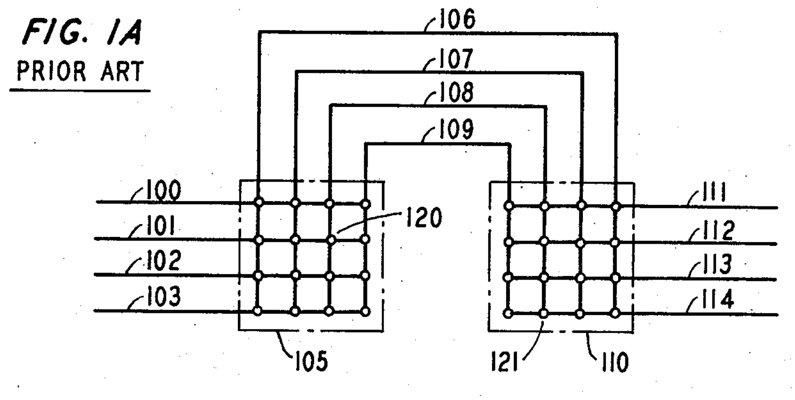
FIG. 1A PRIOR ART
FIGS. 1A–C show typical prior art time division switching networks.
Figure 1B:
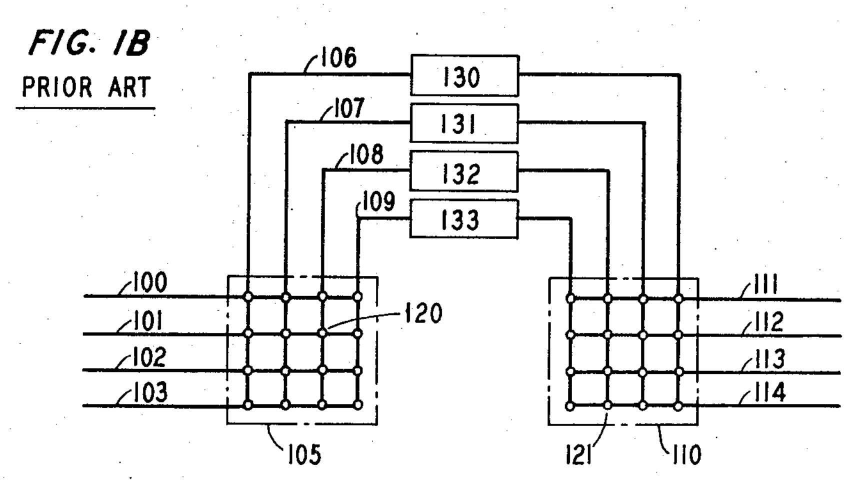
FIG. 1B PRIOR ART
Figure 1C:
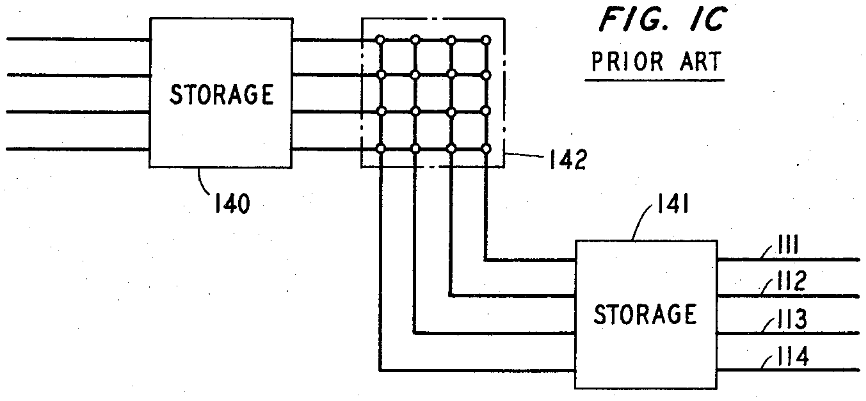
FIG. 1C PRIOR ART

FIGS. 1A–1C illustrate three prior art arrangements for switching time division multiplex information through a network. The FIG. 1A arrangement is disclosed, for example, in D. B. James et al. U.S. Pat. No. 2,957,949 issued Oct. 25, 1960 while the arrangements of FIGS. 1B and 1C are disclosed, for example, in U.S. Pat. No. 3,446,917 issued on May 27, 1969 to H. Inose et al.

Initially, time divided information in coded form was switched through time division gates in the manner shown in FIG. 1A. Thus input highways 100–103 each may contain a plurality of distinct messages in time multiplexed channels which are directed to time channels in output highways 111–114 via switching stages 105 and 110 and interstage highways 106–109. In this arrangement a message may be switched from any input highway to any output highway, but it must be retained in the same time channel through the network to preserve system synchronism. For example, a message arriving on highway 101 in time channel A may be switched to highway 114 so long as it remains in channel A. This may be accomplished, for example, by enabling time division gates 120 and 121 simultaneously during time channel A, the message then being transferred via junctor 108.

The major disadvantage inherent in this approach is evident from consideration of the possibility, in the previous example, of time channel A being occupied with other messages in succeeding stages of the network reached through outgoing highways 111–114. Such a condition, of course, prevents completion of the connection involving a message in time channel A of highway 101, and it is said that the call is blocked. Such blockage may occur despite the fact that some channels in the outgoing trunks are available for assignment, thus presenting a difficult traffic handling problem.

Prior art solutions to this blocking problem are illustrated in FIGS. 1B and 1C. A delay device, included in each transmission path through a switching stage, permits an interchange of time channels thereby facilitating the completion of a call connection through this stage so long as any time channel is available in each highway forming the transmission path. FIG. 1B employs the same basic approach as that shown in FIG. 1A except that storage has been introduced into the intermediate highways. Thus an input time channel is switched onto an intermediate highway in its original time channel as before, but the delay encountered in the corresponding one of devices 130–133 permits it to leave the intermediate highway in a different time channel. Thus in the example used to illustrate the FIG. 1A operation, if channel A is occupied on highway 114, a message arriving on highway 101 in channel A still may be switched via highway 108, through crosspoints 120 and 121, simply by delaying the message in device 132, FIG. 1B, so as to appear in previously idle channel B on highway 114. FIG. 1C depicts another prior art approach in which time channel interchange is employed. In this instance the signal transmission rate within the network is different from that on the highways. Thus message signals are delayed in storage apparatus 140 and 141 until time channels are available through the switch matrix 142 and on the output highways 111–114, respectively.

Before proceeding to the detailed aspects of the present invention, it is well to consider by analogy earlier efforts in space division switching technology. In particular, U.S. Pat. No. 3,358,269, issued Dec. 12, 1967 to V. E. Benes, describes a space division network for connecting any one of $N$ input terminals to any one of N output terminals for a broad range of values for $N$. The network described in the Benes patent has come to be known as a rearrangeable network. In the context of a connecting telephone system, it is possible to connect, for purposes of carrying on a conversation or otherwise, any one of $N$ calling parties to any one of $N$ called parties. It has been shown by Benes that such conversations may proceed during the course of a given call over different paths at different times during the conversation.

The Benes system in general provides a plurality of cascaded switching stages of interconnected switching matrices. It is clear, however, that rearrangeability in the case of a space division network introduces considerable additional complexity with attendant cost and potential maintenance problems.

Other space division rearrangeable networks are described in U.S. Pat. No. 3,129,407 issued to M. C. Paull on Apr. 14, 1964. Similar rearrangeable networks using so-called $\beta$ elements are described in A. E. Joel, Jr., "On Permutation Switching Networks," B.S.T.J., vol. 47, no. 5, May-June 1968, pp. 813–822.

For the case where there are $N=2^m$ input lines, it has been shown by Benes that the number of stages required may be given by $2m-1$ where $m=log_2N$. Details of the individual switching elements and the method of interconnecting them to realize a space division rearrangeable network are disclosed in the Benes and Paull references, supra.

Figure 2A:
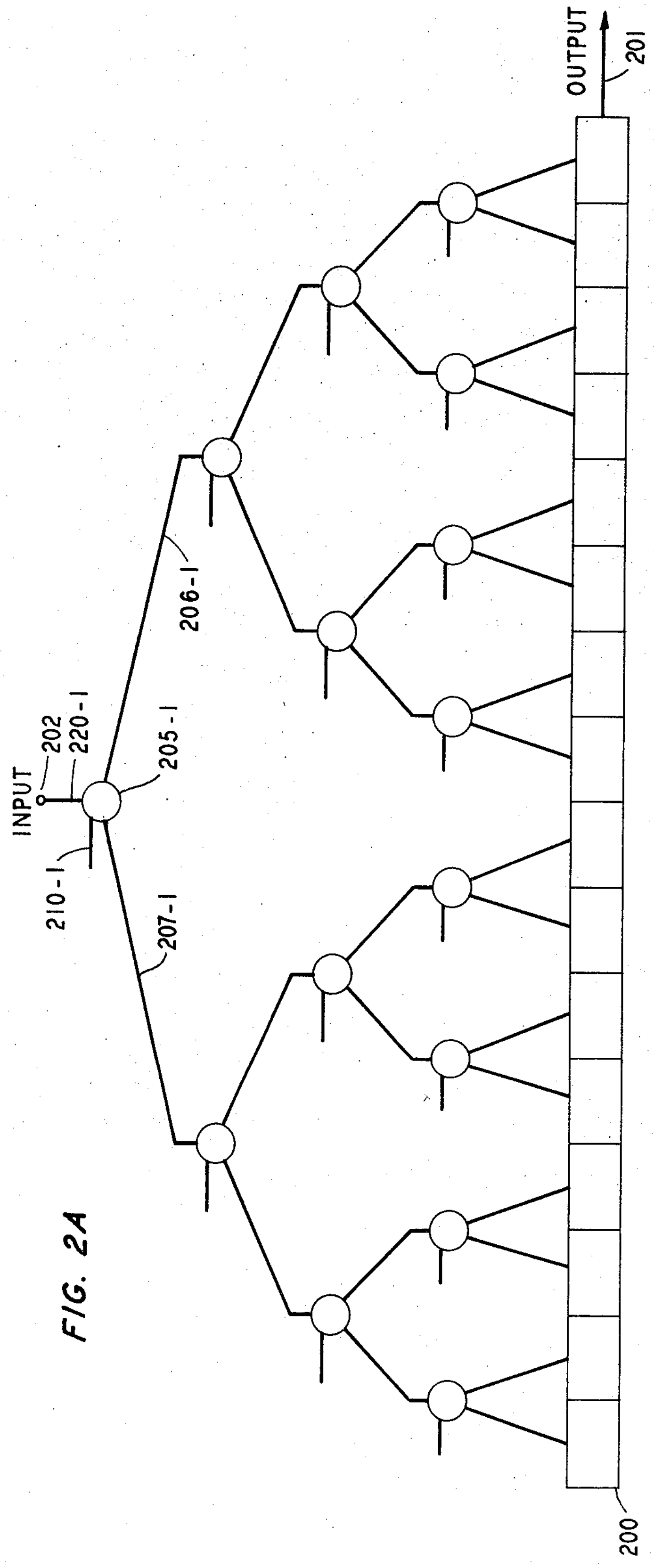
FIGS. 2A–C illustrate details of a basic time slot interchanger.
Figure 2B:
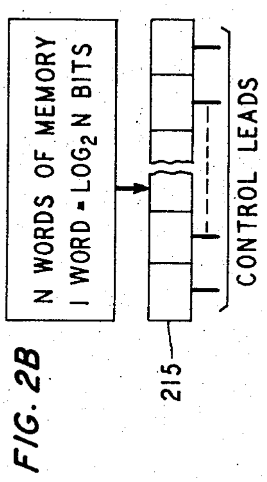
Figure 2C:
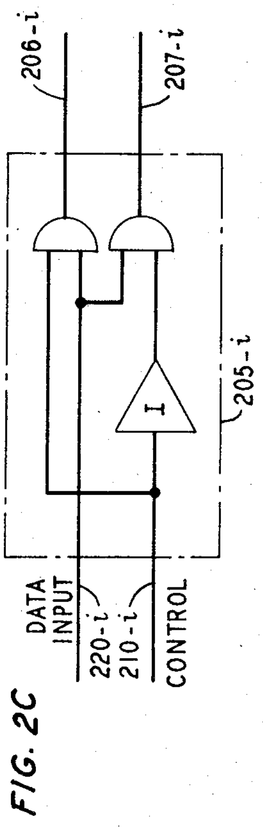

A description of a basic technique for time slot interchange useful in understanding the present invention will now be given in connection with FIGS. 2A–C. FIG. 2A shows a hierarchical tree structure for reordering a sequence of data signals applied at node 202. Each of the branch points of the tree includes a binary decision circuit, one typical form of which is shown in FIG. 2C. Control is provided by the memory shown in FIG. 2B.

Data in each of an assumed $N$ time slot are presented in sequence at node 202. Simultaneously, the control words corresponding to these input time slots are read in corresponding sequence from the memory in FIG. 2B. These control words typically indicate the desired respective output time slots. With the control leads **210-*i*** at each hierarchical level conveniently connected together at a common node, a signal indicative of the appropriate bit of the control word is applied to this common node. Thus for the case where $N=2^4=16$ shown in FIG. 2A, the number of bits of storage required in each control word is $\log_2N=4$. The total required storage is then $N\log_2N$ bits, or $16 \cdot 4=64$ bits for $N=16$.

In any event, the data in each successive time slot within a frame are sorted through the tree structure and temporarily stored in the appropriate segment of shift register 200. As shown in FIG. 2A, the number of data bits in each time slot may be arbitrary. All that is required is that shift register 200 be arranged to store, in order, all of the bits in each time slot. Thus, for example, if a time slot were to include four bits, each of the indicated 16 bytes in shift register 200 must be able to store four bits. For purposes of describing the present invention, however, it will be assumed that each time slot includes a single bit.

The form for the binary decisional circuits shown in the circuit of FIG. 2C is merely intended to be typical. Each decisional element (shown as 205-*i* in FIG. 2C) includes an input node 220-*i*. The two output nodes are designated as 206-*i* and 207-*i*. If the particular bit corresponding to the level in the tree structure where a given element 205-*i* is located is a 1, then control lead 210-*i* will exhibit a 1 condition. The connection of control leads to the contents of the memory is not explicitly shown in FIG. 2A. It should be understood, however, that there is a direct connection between the bit positions in the input-output register 215 in FIG. 2B and the control lead 210 in FIG. 2C. Thus, data arriving on the input node 220 are directed to output node 206 whenever a 1 indication appears on node 200. When a 0 appears on node 210, the data are steered through the decision element 205 to output node 207.

Other detailed means for storing information representative of a desired time slot interchange relationship and the means for actually effecting such an interchange in response to the stored information are described, for example, in U.S. Pat. No. 3,172,956 issued to Inose et al. on Mar. 9, 1965 and in U.S. Pat. No. 3,446,917 issued to Inose et al. on Mar. 27, 1969.

Figure 3:
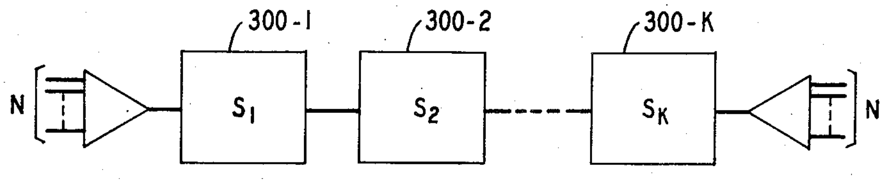
FIG. 3 illustrates the basic cascaded arrangement of stages in accordance with the time slot interchanger of the present invention.

FIG. 3 shows the basic arrangement of a time slot interchanging network in accordance with the present invention. Shown there is a multi-stage cascaded network having stages 300-1, 300-2,...,300-*k*. Depending on the particular one of the detailed configurations described herein, these stages will exhibit various advantages. A common highway is typically arranged to carry data signals in frames containing $N$ time-multiplexed time slots.

Figure 4:
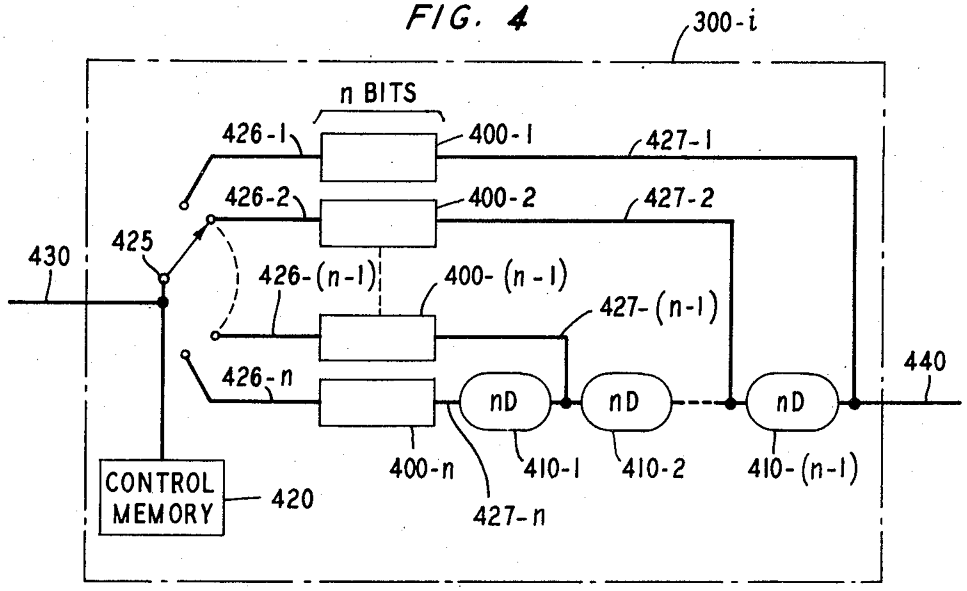
FIG. 4 illustrates one embodiment for the stages illustrated in FIG. 3.

FIG. 4 shows a typical stage in the switching network shown in FIG. 3 in accordance with one embodiment of the present invention. Again it is assumed for purposes of illustration that each time division frames includes $N=n^2=16$ times slots.

In the circuit of FIG. 4 the $N=n^2$ input signals in each frame are presented at lead 430 where they are distributed into one of a plurality of $n$-bit shift registers 400-1 through 400-*n* by distributor 425 under the control of data stored in control memory 420. These latter two elements are shown in greater detail in FIG. 5. Thus, in every frame the data in each of the $N$ time slots is distributed to an appropriate one of the $n$ shift registers 400-1 through 400-*n*.

It will be assumed for purposes of illustration that the $N=16$ input time slots shown column (1) in table I are to be reassigned (interchanged) to the respective time slots shown in decimal form in column (2) and in binary form in column (3).

TABLE I

| (1) Input T/S | (2) Output T/S | (3) Output T/S (Binary) | (4) Stage 1 Shift Register | (5) Stage 2 Shift Register |
|---|---|---|---|---|
| 0 | 7 | 0111 | 2 | 4 |
| 1 | 4 | 0100 | 2 | 1 |
| 2 | 5 | 0101 | 2 | 2 |
| 3 | 0 | 0000 | 1 | 1 |
| 4 | 2 | 0010 | 1 | 3 |
| 5 | 6 | 0110 | 2 | 3 |
| 6 | 8 | 1000 | 3 | 1 |
| 7 | 1 | 0001 | 1 | 2 |
| 8 | 9 | 1001 | 3 | 2 |
| 9 | 0 | 1010 | 3 | 3 |
| 10 | 15 | 1111 | 4 | 4 |
| 11 | 3 | 0011 | 1 | 4 |
| 12 | 12 | 1100 | 4 | 1 |
| 13 | 13 | 1101 | 4 | 2 |
| 14 | 14 | 1110 | 4 | 3 |
| 15 | 11 | 1011 | 3 | 4 |

Figure 5:
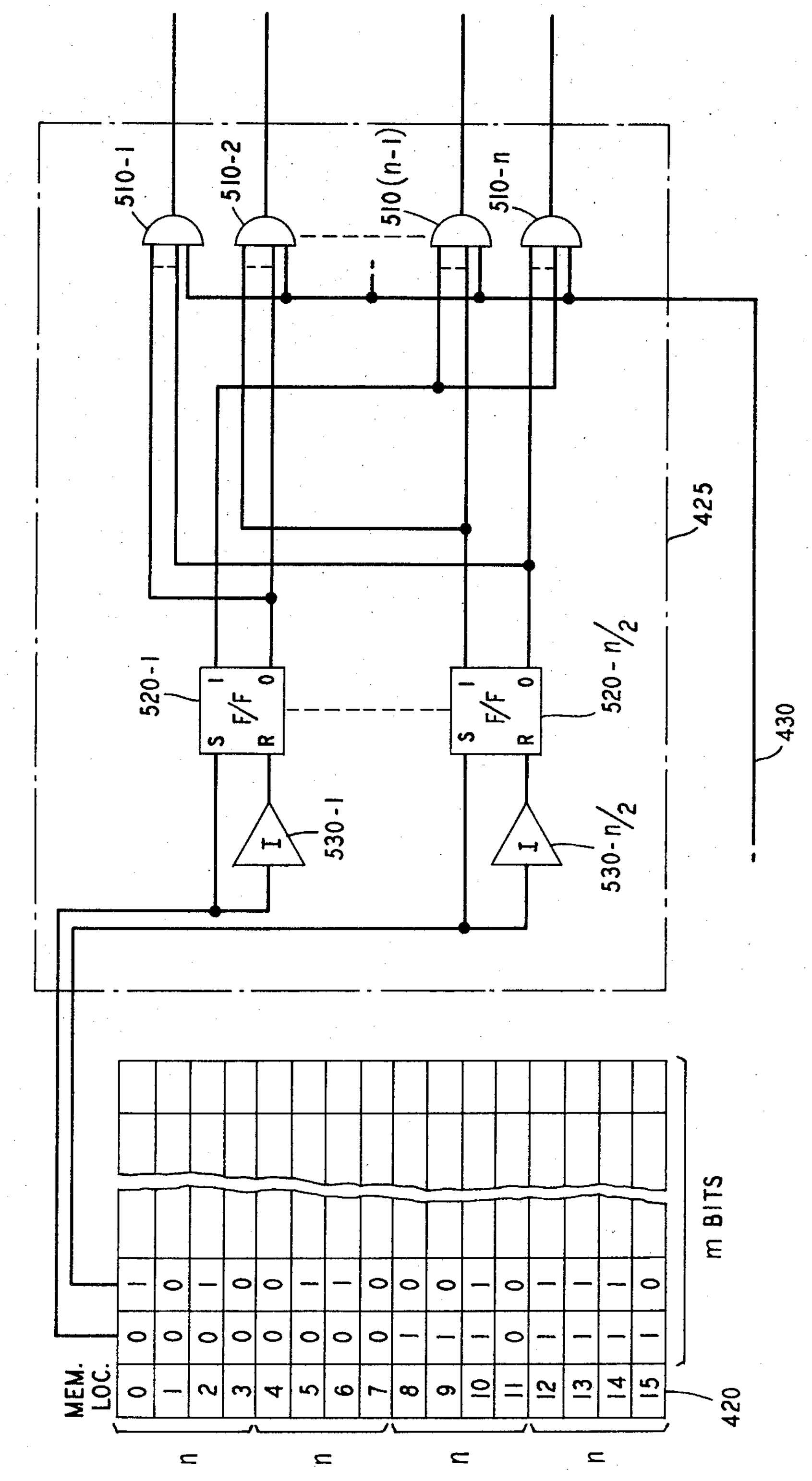
FIG. 5 illustrates a control circuit for use in connection with the circuit of FIG. 4.

FIG. 5 shows a representation of memory 420 connected to distribution circuit 425. While memory 420 is shown to have 16 word locations, it should be understood that in general $N$ words are required. Likewise, although only two bits are explicitly shown stored in each memory word $m = log_2N$ bits are in general required. Similarly, $n$ output gates 501-*i* are used to direct the input data stream on lead 430 to one of the $n$ shift registers 400-*i* in FIG. 4. The contents of memory 420 are read in sequence, one word per time slot, beginning with location 0. Double-ended outputs for driving gates 510-*i* are provided by flip-flops 520-1 through 520-*n*/2 along with inverters 530-1 through 530-*n*/2. Access circuitry for memory 420 is of standard design and is not shown.

With the desired interchange as indicated in table I, columns (1), (2), and (3), the first stage $S_1$ in FIG. 3, distributes the data in input time slots in accordance with the first $m/2 = 2$-bits bytes of the binary representation in column (3) in table I. Thus, for example, data in input time slots 3, 4, 7 and 11 are distributed to the top shift register 400-1 in FIG. 4 as illustrated in column (4) in table I. Likewise, data in time slots 0, 1, 2 and 5 are sorted into shift register 400-2 as shown in column (4) in table I. Other stage 1 shift registers are also shown in column (4) for data in the respective input time slots.

At the end of a frame, data are read from shift registers 400-1 through 400-*n* shown in FIG. 4 by way of corresponding cascaded combinations of delay units 410-1 through 410-($n$—1), each of which provides a delay of $n$ units. The output of shift register 400-1 is thus read without delay, that of shift register 400-2 is delayed by $n$ delay units, and so forth. The output of shift register 400-*n* is read at node 440 beginning after a delay of $(n-1)n$ units and ending after a delay of $n^2 = N$ units after a frame is complete. If the unit of delay, D, is taken equal to the duration of an input time slot, the data is completely read out of delay units 410-*i* at the time a new frame is beginning. Since data from no more than $n$ time slots can be presented at the input of a stage during the time that data are shifted out of the registers 400-*i*, the output on lead 440 is a continuous replica (except for reordering) of the input on lead 430, with a delay of one frame having been introduced.

The distribution performed by each stage in the cascaded network shown in FIG. 3, when constructed in accordance with the circuit of FIG. 4, is thus seen to be controlled by N bytes each comprising $m/2=\log_2 n=\frac{1}{2}\log N$ bits. As has been shown above, the first byte comprising $m/2$ bits (in the desired time slot) is used to direct the sorting at stage 1. Likewise, the second byte comprising $m/2$ bits is used to direct the sorting at stage 2 (see column (5) in table I).

Because the arrangement of FIGS. 4–5 processes the input form $N$ (or less) input times slots $n=\sqrt{N}$ at a time, only two stages are required for the presently described embodiment of the circuit shown in FIG. 3. Thus in the terminology of FIG. 3, $K=2$ and $S_2$ is the final stage.

Figure 6:
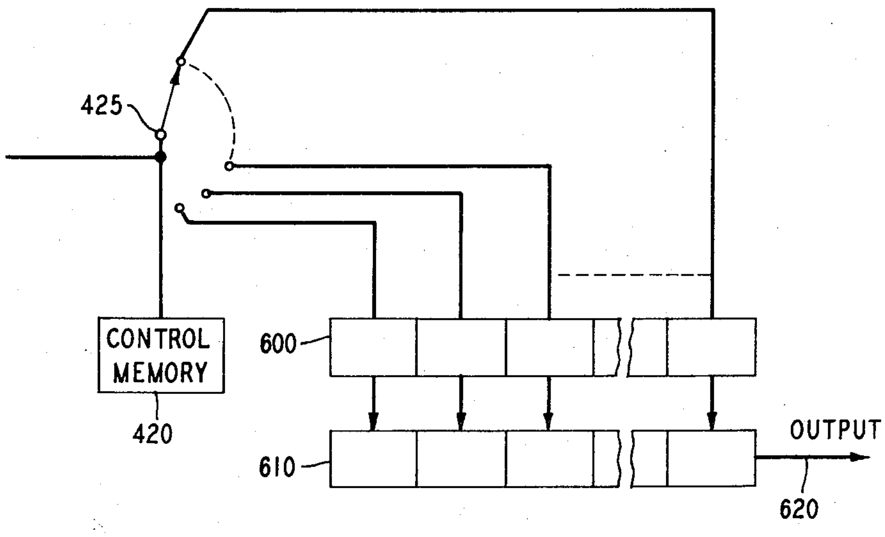
FIG. 6 illustrates a useful simplification in the final stage of the arrangement of FIG. 3.

Further, because the final stage of the interchange network shown in FIGS. 3–5 performs a partial interchange which affects the final ordering of time slots in a frame only within an $n$-bit range, a degenerate network shown in FIG. 6 may be used for that final (second) stage. As shown in FIG. 6, distributor 425 operating under the control of the second $m/2$ bit byte in the $j$th word in memory 420 sorts data in the $j$th subset of $n$ input time slots and places these data in the appropriate bit location in $n$-bit shift register 600. After each set of $n$ time slots, the contents of shift register 600 are transferred in parallel into shift register 610 from which they are shifted in normal serial fashion. This parallel transfer permits shift register 600 to be available to receive data for the next subset of $n$ time slots. The output on lead 620 is then the fully interchanged output data stream as specified by column (2) in table I.

The $n$ $n$-bit registers shown in FIG. 4 may in appropriate cases be replaced by $k$ one-bit registers, $k$ and 1 being arbitrary integers with $N=k1$.

The rearrangeable networks described by Benes, supra provide for space division interconnection in the manner described above. Joel, in the paper "On Permutation Switching Networks," BSTJ, June 1968, pp. 813–822, describes the application of rearrangeable networks using so-called $\beta$ elements. Tsao-Wu and Opferman, "On Permutation Algorithms for Rearrangeable Switching Networks," Proceedings IEEE International Conference on Communications, June 1968, further described such networks.

Figure 7:
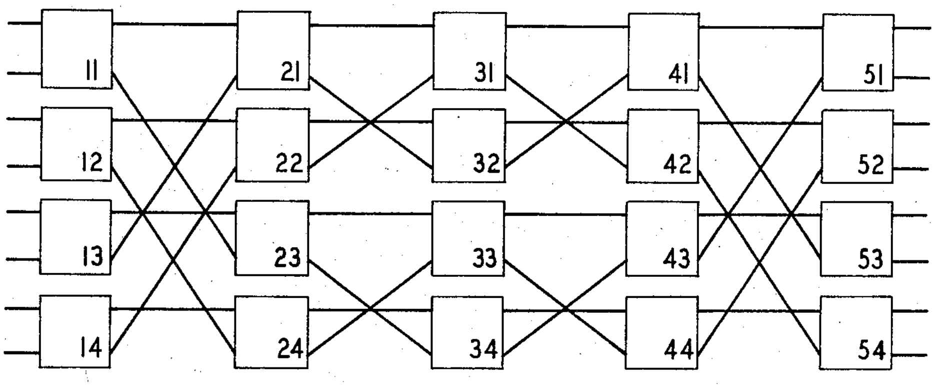
FIG. 7 shows a space division rearrangeable network of $\beta$ elements for the case of $N=8$.

The $\beta$ elements conveniently employed in rearrangeable networks according to Joel and others may be considered to be essentially double-pole-double-throw polarity reversing switches which either permute or do not permute a pair of inputs. FIG. 7 shows a rearrangeable space division network of $\beta$ elements in accordance with the teachings of Tsao-Wu and Opferman, for example. In FIG. 7 there are shown $N$ inputs and $N$ outputs, with $N=8$. The link pattern shown in FIG. 7 is somewhat different than that usually shown in the literature. However, this modification may be easily shown to correspond to a reordering of the inputs to the stages. Since the reordering of the inputs to any non-blocking network (and in particular a rearrangeable network) does not affect its switching characteristics, the network of FIG. 7 is isomorphic to the usual form. Each of the $\beta$ elements has been numbered in matrix fashion to facilitate further reference. The number of stages in the network of FIG. 7 is, as usual, equal to $2\log_2 N-1$.

Figure 8:
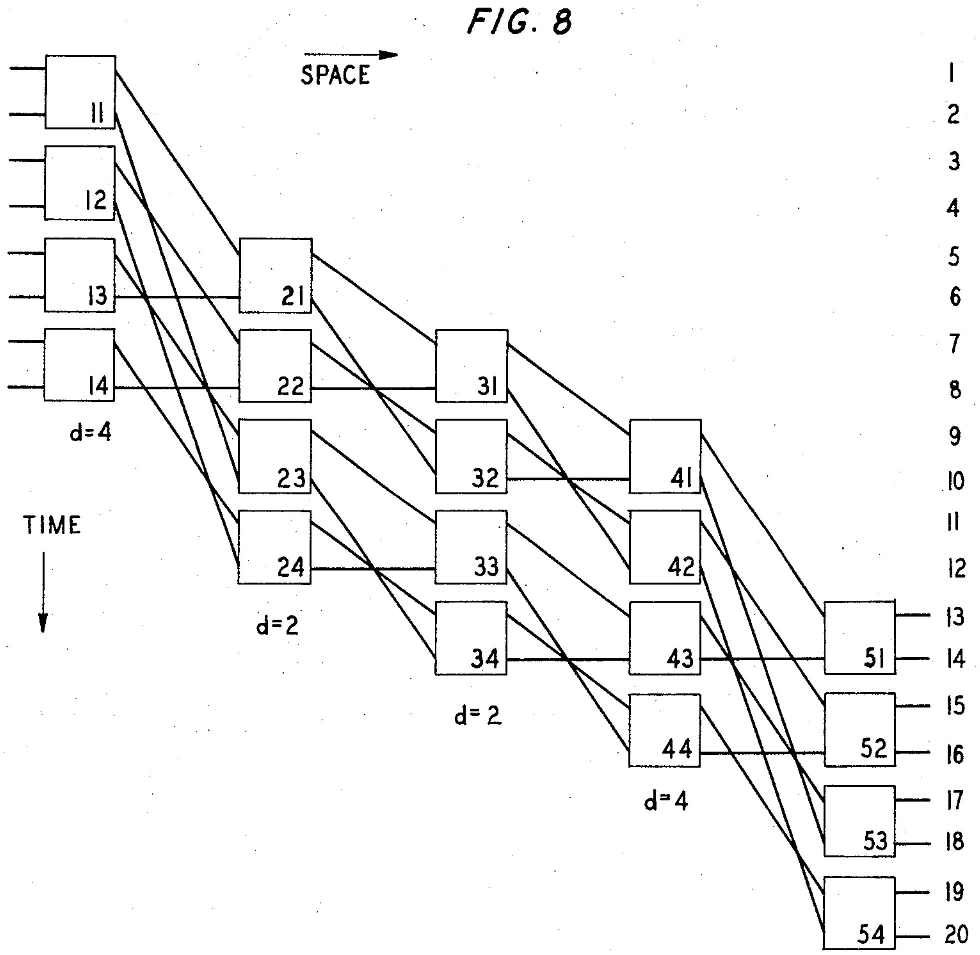
FIG. 8 shows a combined space-time diagram based on the network of FIG. 7 which is useful in deriving a time division switching network in accordance with one embodiment of the present invention.

A time division network having the general form shown in FIG. 3 and bearing some resemblance to the rearrangeable space division network shown in FIG. 7 will now be derived. Specifically, FIG. 8 shows the network of FIG. 7 with a time scale superimposed at the right. By considering each column of the network in FIG. 7 as a stage in a time division switching network in the manner of FIG. 3, it is seen that the vertical displacement of one stage of the network of FIG. 8 relative to other stages shown there is indicative of overall delay introduced into an input sequence. It should be noted that in a given column the top output of each $\beta$ element is delayed or slipped by $d$ units, ($d$ being a function of the stage as will be indicated below), while the bottom output of each $\beta$ element is either not delayed or is delayed by $2d$. It should also be noted that in addition to performing the rearranging (i.e., time slot interchanging), there is an absolute delay introduced at each stage. This is necessary to preclude the possibility of a requirement for advancing a signal in time, clearly an unrealizable condition.

Figure 9:
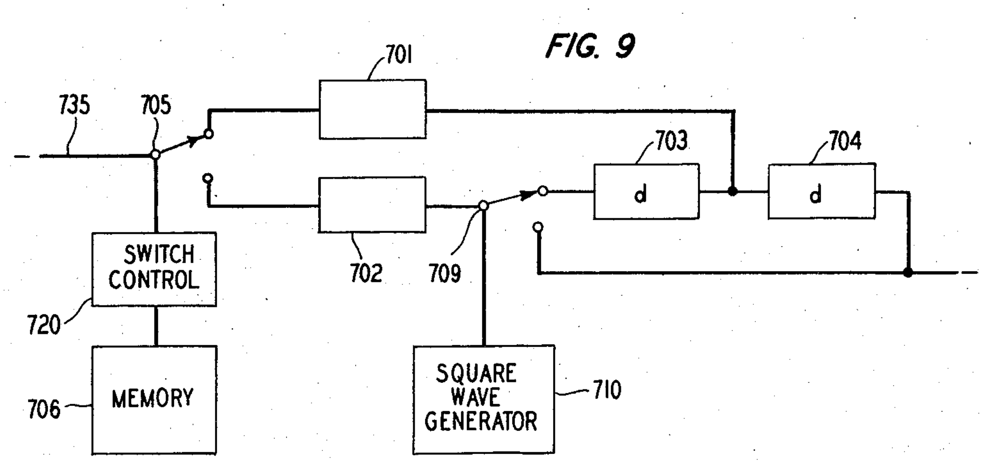
FIG. 9 shows a typical stage of a time slot interchanger in accordance with FIG. 3 based in part on the network of FIG. 8.

The structure for a typical stage of a multistage time division network based on the rearrangeable network of FIG. 7, as motivated by the interpretation of FIG. 8, is given in FIG. 9. It should be noted that successive pairs of input data signals, beginning with the data presented in the first two time slots in a frame, are placed in two registers 701 and 702 according to information stored in a local memory 706. If each time slot comprises a single bit, these registers are one-bit registers, i.e., flip flops or the like. This operation requires $N/2$ one-bit words of control information; if the destination of one of a pair of data items is specified, the other must be directed to the other of the two destinations.

Figure 10:
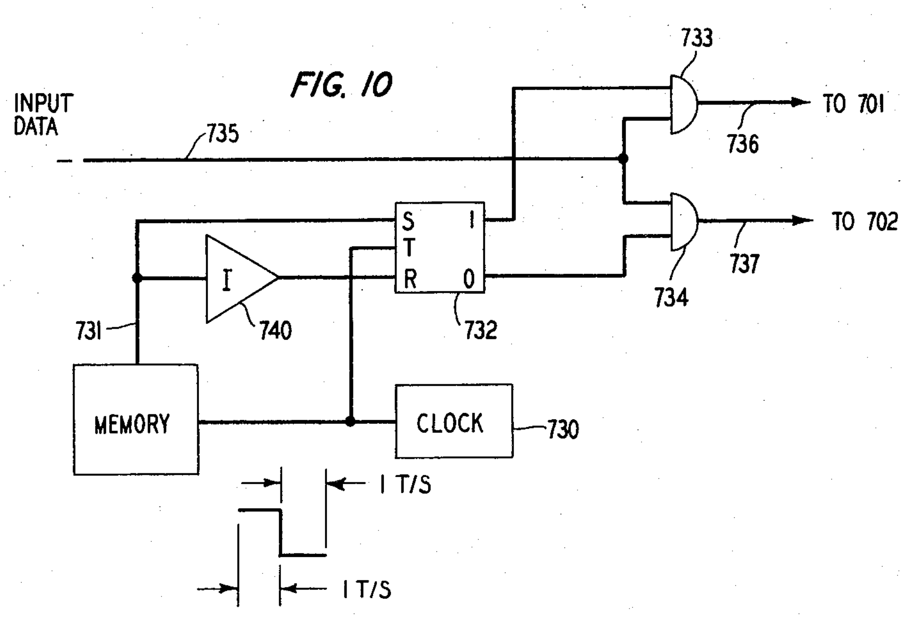
FIG. 10 shows a controlled switch for use in the network of FIG. 9.

The entry of data into registers 701 and 702 is controlled by switch 705 and associated switch control circuit 720. A portion of a typical switch control circuit and associated circuits is shown in FIG. 10. Thus a clock 730 provides a square wave signal at a periodic rate equal to one-half the time slot repetition rate. Memory 706 is responsive in well-known fashion to the rising edge of the square wave clock signal occurring at the beginning of a sequence of two time slots to cause the accessing of the next word from memory 706. This memory read out appears as a 1 or 0 signal on lead 731. To provide a double-ended output, an inverter 740 of standard design is also provided.

The double-ended memory output is then impressed on flip-flop 732, thus establishing this flip-flop in a 1 or 0 condition. When flip-flop 732 is in the 1 state AND gate 733 is enabled and input data appearing on lead 735 is permitted to pass to register 701 by way of lead 736. Similarly, when flip-flop 732 is in the 0 state, AND gate 734 is enabled and input data passes to register 702 via lead 737.

Flip-flop 732 is also provided with a toggle input which causes the state of flip-flop 732 to change in response to a negative-going signal. Clock 730 is arranged to provide such a signal at the midpoint of its period. Thus after a one time slot interval beginning at the outset of a two time slot sequence, the state of flip-flop 732 is changed and data occurring in the second of two time slots is appropriately directed to the register 701 or 702, which was not used during the preceding time slot.

After the 2 registers are filled, their contents are shifted to the right to make way for the next pair of signals. The output of the top register 701 is always delayed $d$ time slots by delay unit 704 while the output of the bottom register is alternately delayed $2d$ time slots by the combination of delay units 703 and 704, or not delayed at all. This corresponds directly to the structure of FIG. 9. The formulas for $d$ at the $i$th stage are:

$d=2^{\log_2 N - i}$ for $i=1, \ldots, \log_2 N-1$ $d=2^{i - \log_2 N + 1}$ for $i=\log_2 N, \ldots 2 \log_2 N-1.$ A switch 709 determines whether the output of the bottom register is delayed by $2d$ or not. This switch is conveniently controlled by output signals from a square wave generator 710 with period $d$ at each stage. Thus no local memory is required to provide the selection at switch 709.

As in the case of the system of FIGS. 4–6, an alternate form can be used for the last stage. This alternate form is shown in FIG. 11 and is based on the same technique used in FIG. 6, except that in this case only $N/2$ bits of local memory are required.

Figure 11:
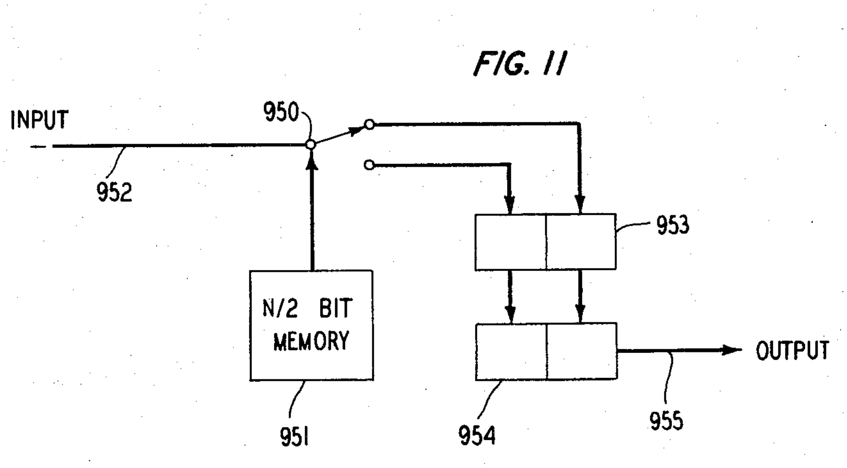
FIG. 11 shows a degenerate version of a stage in accordance with the circuit of FIG. 9.

Specifically, since the last of the $2\log_2 N-1$ stages alters the final time slot alignment by at most one time slot, the arrangement of FIG. 11 may be used. Thus, a controlled switch of the type disclosed above in FIG. 10, for example, operating in customary fashion under the control of $N/2$ bits of control information stored in memory 951, directs data in each pair of time slots to appropriate cells in register 953. At the conclusion of a pair of time slots, these data are transferred in parallel to shift register 954 and are shifted out in sequence on lead 955. Another bit is then retrieved from memory for directing the storage in register 953 of data in the next pair of input time slots.

The generation of the contents of the local memories such as 706 in FIG. 9 will be described below.

Figure 12:
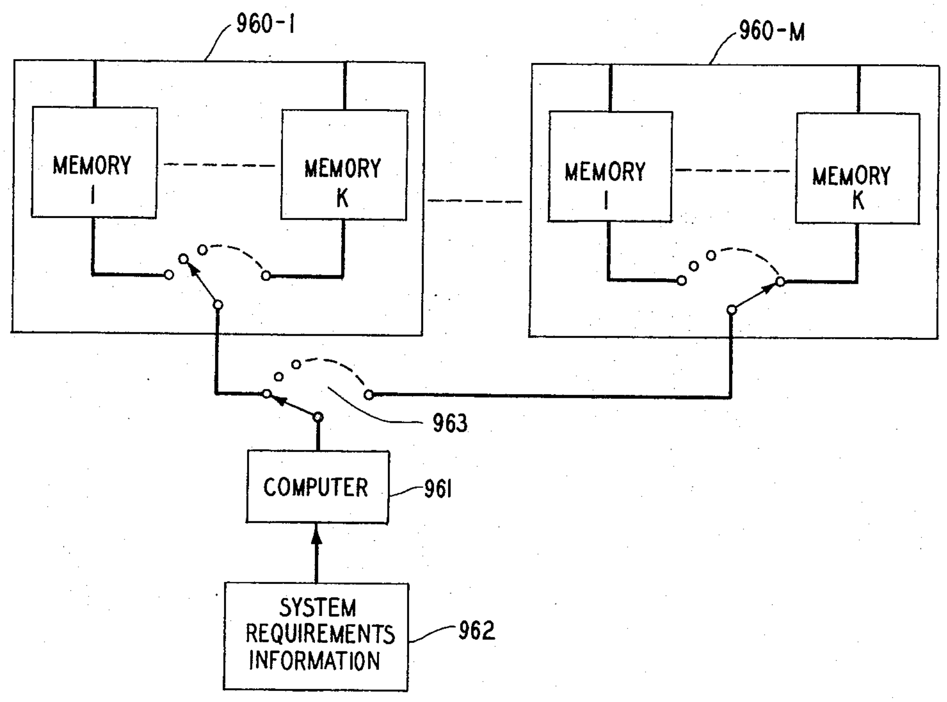
FIG. 12 shows a typical time-shared arrangement for computing required control memory contents for use in various multi-stage time slot interchangers.

Although separate special purpose apparatus may be constructed to perform the computations required in determining the memory contents for each stage in the various time slot interchanges described herein, a preferred embodiment comprises a programmed general purpose digital computer. Specifically, FIG. 12 shows a computer 961 connected through a switch 963 to a network such as 960-1. This latter network includes the $K$ memories associated with respective ones of the K stages of the time slot interchange of FIG. 3. Computer 961 receives desired connection data (dialing, off-hook, hang-up data, etc., in the case of a telephone network) from a system requirements source 962. This typically comprises the information derived by the system elements (aside from the pulse shifting or time slot interchanging apparatus) described in the above-mentioned U.S. Pat. No. 3,446,917. In some applications these or equivalent additional system elements may be combined with one or more of the above-described embodiments of the present invention to implement an entire telephone or similar switching system.

An alternate embodiment of the present invention having the configuration of the network of FIG. 3 and based in part on sorting technology will now be described. Sorting is similar to switching in that the net result is a permutation in some sense. In sorting, however, the permutation is directed by the content of the signals being sorted. In switching, on the other hand, the permutation is determined by individual switches in a network which switches in turn are controlled by external criteria. Thus in sorting networks the routing is closely related to the permutation. It will be shown below that the complexity of a time slot interchanger (TSI) based on technology related to sorting networks is very similar to that of TSI described above bearing a relation to rearrangeable networks. Actual implementation of a sort-related TSI is found to be simpler is some technologies.

The arts of sorting signals by programmed and special purpose apparatus are well developed. A summary of many of the techniques used in sorting are described in I. Flores, Computer Sorting, Prentice-Hall, 1969. Other specific sorting techniques are described in U.S. Pat. Nos. 3,505,653 and 3,514,760 issued to W. H. Kautz on Apr. 7, 1970, and May 26, 1970, respectively, and in U.S. Pat. No. 3,380,029 issued to M. A. Geotz on Apr. 23, 1968. Still other related techniques are described in "Sorting Networks and Their Application," by K. E. Batcher, Proc. AFIPS 1968 SJCC, Thompson Books, 1968, pp. 307–314.

Figure 13:
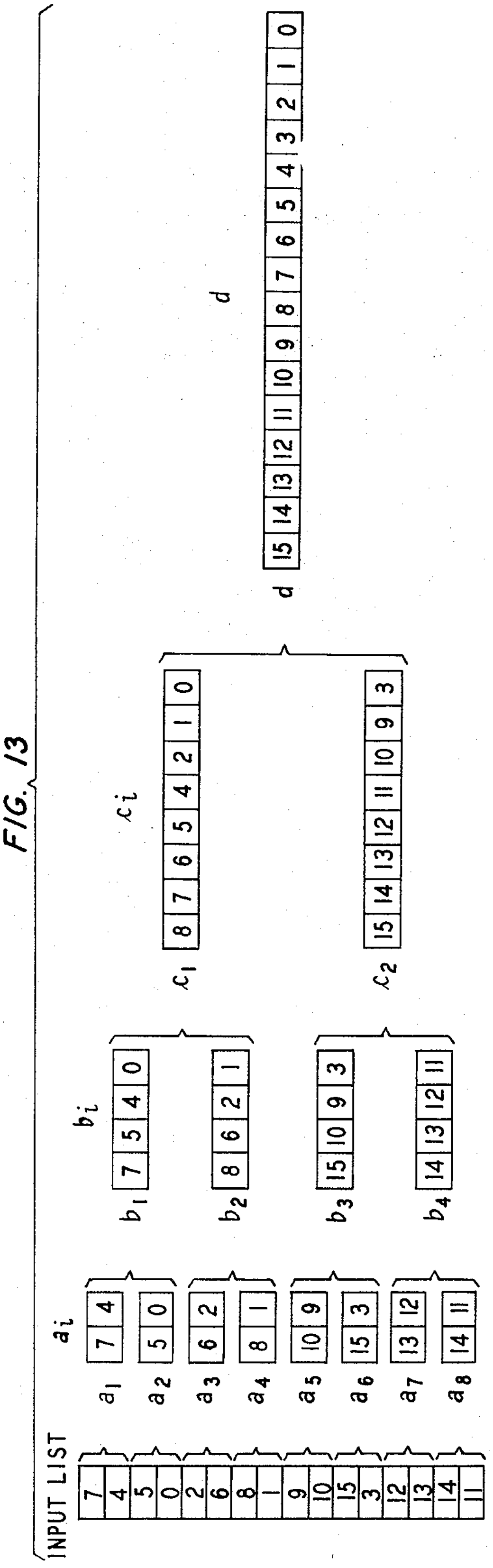
FIG. 13 illustrates the basic sort-merge technique.

One basic sorting technique well known in the art called sort-merge is illustrated in FIG. 13. In the case shown, an input list comprises 16 elements to be sorted. In the first step of a typical sort-merge algorithm pairs of elements are sorted to yield 8 lists $a_i$, = 1, 2,...,8, each comprising two elements. In typical occurrence the elements of the input list are numbers. thus the sorting accomplished at the first step is in accordance with the magnitude (signed or unsigned) of the elements. The lists $a_i$ are represented in FIG. 13 as horizontal lists, the rightmost one of which will be considered to have the smallest magnitude of the pair.

At step 2 a typical sort-merge algorithm provides a pairwise merge of two consecutive lists, $a_i$ and $a_{i+1}$. The lists $b_i$, $i$ = 1, 2, 3, 4 thus each comprise the elements which were originally ordered in respective quarters of the input list. In each list $b_i$, the lowest ordered element, shall be considered to occupy the rightmost position. The remaining three elements are ordered in increasing magnitude to the left. Two lists $c_i$, $i$ = 1, 2, each comprising eight ordered elements, are then generated by pairwise merging of the lists $b_i$. Finally, a single output list $d$ is then generated by merging the lists $c_i$.

At each step the merging is accomplished on the basis of selecting the lowest of the two elements presented at the right of the lists generated at the preceding step. Thus, for example, at step 3 the list $c_1$ is generated by selecting the rightmost element from either $b_1$ or $b_2$ in accordance with a determination of which of these two elements is lower in magnitude (or other measure). After an element is selected, the remaining elements of the list are considered to be shifted one position to the right. Ultimately all of the elements from each list are selected.

Figure 14:
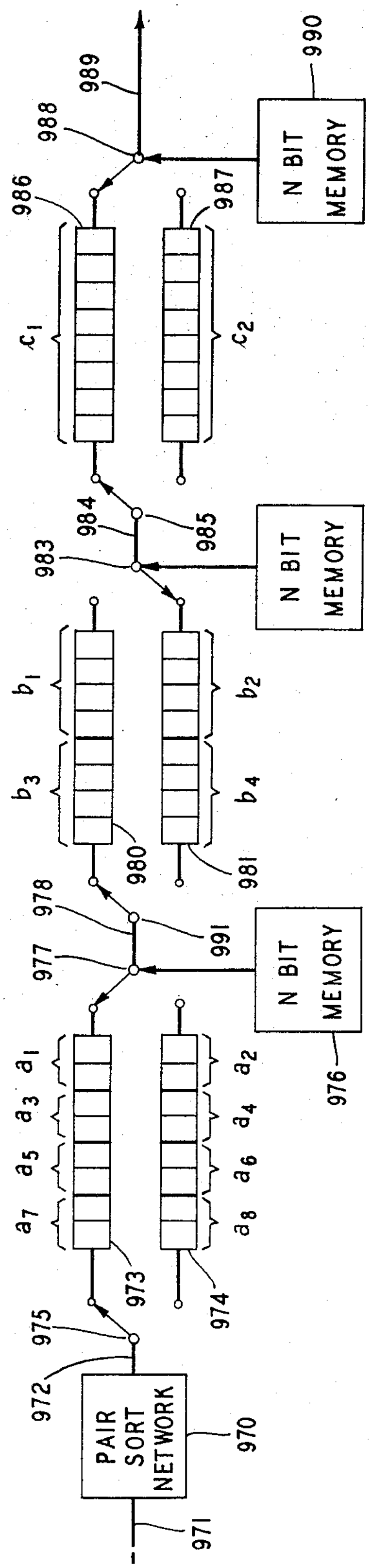
FIG. 14 shows a simplified network for performing time slot interchange by sort-merge techniques.

FIG. 14 shows one implementation of a time slot interchanger in accordance with the present invention based in part on sort-merge techniques. Shown in FIG. 14 is a first stage identified as 970 and entitled "Pair Sort Network." This network will be described in more detail below. The function of network 970 is equivalent to that performed in step 1 of the algorithm illustrated in FIG. 13. Thus each pair of input samples entered at lead 971 is delivered on lead 972 in accordance with a desired ordering. In the case of the circuit of FIG. 14, however, the ordering is in accordance with stored information which is a function of a desired time slot interchange pattern. Output signals appearing on lead 972 are alternately presented to upper shift register 973 or lower shift register 974. FIG. 14 indicates the contents of shift registers 973 and 974 after data occurring in an entire 16 time slot frame has been processed by network 970 and delivered to shift registers 973 and 974.

Distributor 975 is of standard design and is clock controlled, so that no additional memory need be provided to direct the alternation of consecutive pairs of input data elements to shift registers 973 and 974. The outputs from shift registers 973 and 974 are selected by selector 977 under the control of $N$-bit memory 976. This corresponds to the merging of the lists $a_i$ in the sense of FIG. 13. In FIG. 14, however, the data are "-merged" under the control of $N$-bit memory 976 rather than as a consequence of the data itself. Data appearing as an output of selector 977 on lead 978 is then distributed to upper or lower shift registers 980 and 981 in alternating fashion. That is, consecutive groups of four elements are directed first to top shift register 980 and then to shift register 981. The contents of shift registers 980 and 981 at the end of a frame are indicated in FIG. 14.

Again the lists of elements stored in upper and lower shift registers are merged under the control of data stored in $N$-bit memory 982. The selection is actually performed by selector 983 and the output delivered on lead 984. Selector 985 then distributes to upper shift register 986 and lower shift register 987 alternating groups of data appearing on lead 984. Finally, a merging of data from shift registers 986 and 987 is accomplished by selector 988 and the output delivered on lead 989. The data appearing on lead 989 is the desired time slot interchanged data stream.

Since only switches 977, 983 and 988 are controlled by memory contents, a reduced amount of memory is shown to be required for the network of FIG. 14. The switches 975, 991 and 988 are controlled in a repetitive manner suitable for control by a clock.

Figure 15:
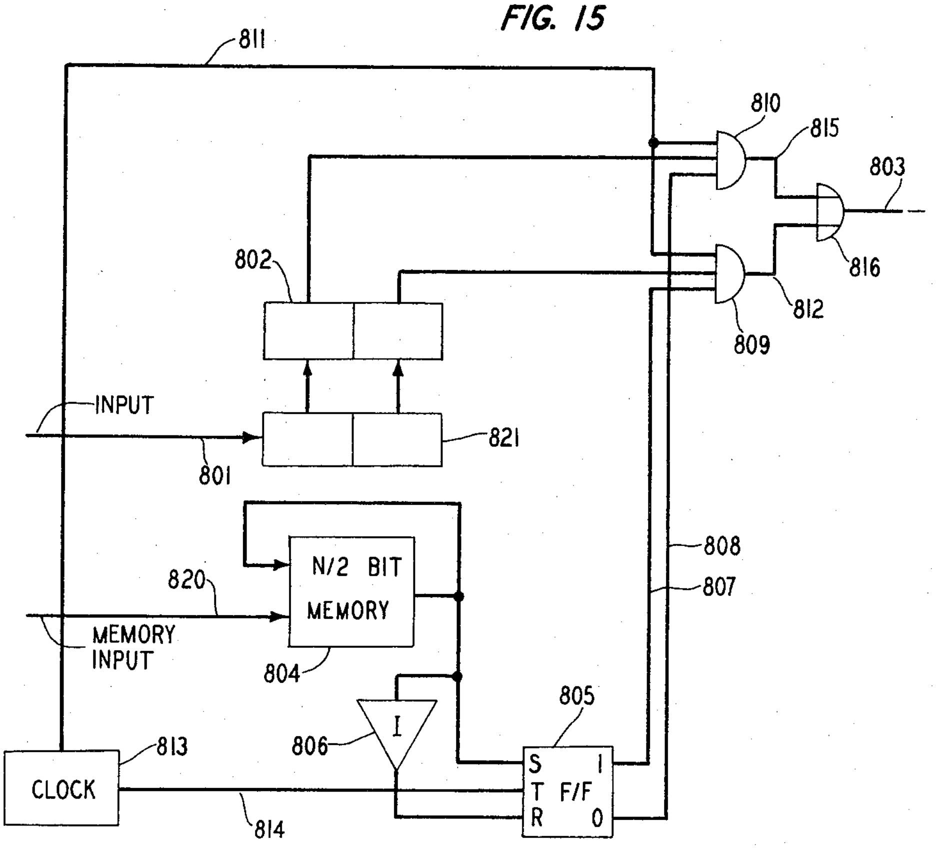
FIG. 15 shows a pair sort network useful in the circuit of FIG. 14.

FIG. 15 shows in more detail the circuitry typically included in pair sort network 970. Input appearing serially on lead 801 is delivered to shift register 802 by way of parallel transfer from buffer register 821. After each 2 element sequence is stored in shift register 802, a two-step selection is made to provide the desired "sorted" output on lead 803. Again it should be pointed out that the "sorting" is not in accordance with the contents of shift register 802, but rather is under the control of $N/2$-bit memory 804. Capacity of memory 804 need only be $N/2$-bits because the input data appearing on lead 801 is treated by pairs.

When a first pair of data elements is entered in shift register 802 a first bit is read from memory 804. This output from memory 804 is used to control the state of flip-flop 805. A double ended output is conveniently provided by inverter 806. Thus, regardless of whether a 1 or a 0 is read from memory 804 at a particular time, the state of flip-flop 805 is immediately determined by the memory readout. If a 1 is read from memory 804, flip-flop 805 assumes the set condition, resulting in a 1 signal condition existing on lead 807. Similarly, a 0 signal appears on lead 808. These latter signal conditions result in the enabling of AND gate 809 and the disabling of AND gate 810. Thus when an appropriate clock signal is applied on lead 811, the contents of the right-hand cell of shift register 802 are read out and delivered on lead 812.

Subsequently, as determined by a signal from clock 813 a signal is provided on lead 814 to the toggle input on flip-flop 805. This results in a change of state for flip-flop 805. The result of this change of state is that AND gate 810 becomes enabled and AND gate 809 becomes disabled. This in turn results in the readout from the left-hand cell of shift register 802 when the appropriate clock signal is provided on lead 811. The output from AND gate 810 appears on lead 815. The outputs from each of the AND gates are delivered to OR gate 816 whose output is the circuit output lead 803.

The contents of register 802 may then be updated, another bit read from memory 804, and the above process repeated. It is clear that if a 0 is read from memory 804, flip-flop 805 initially assumes the 0 state. This results in the contents of the left-hand cell of register 802 being read out first. Upon the toggling of flip-flop 805 the contents of the right-hand cell of register 802 are then read out.

Provision is made for recycling the contents of memory 804 in standard fashion. This permits a fixed pattern of "sorting" and attendant partial time slot interchange to be accomplished by the network in FIG. 15. When it is desired that a different pattern of time slot interchange be performed, new data may be entered into memory 804 on memory input lead 820.

Figures 16, 17:
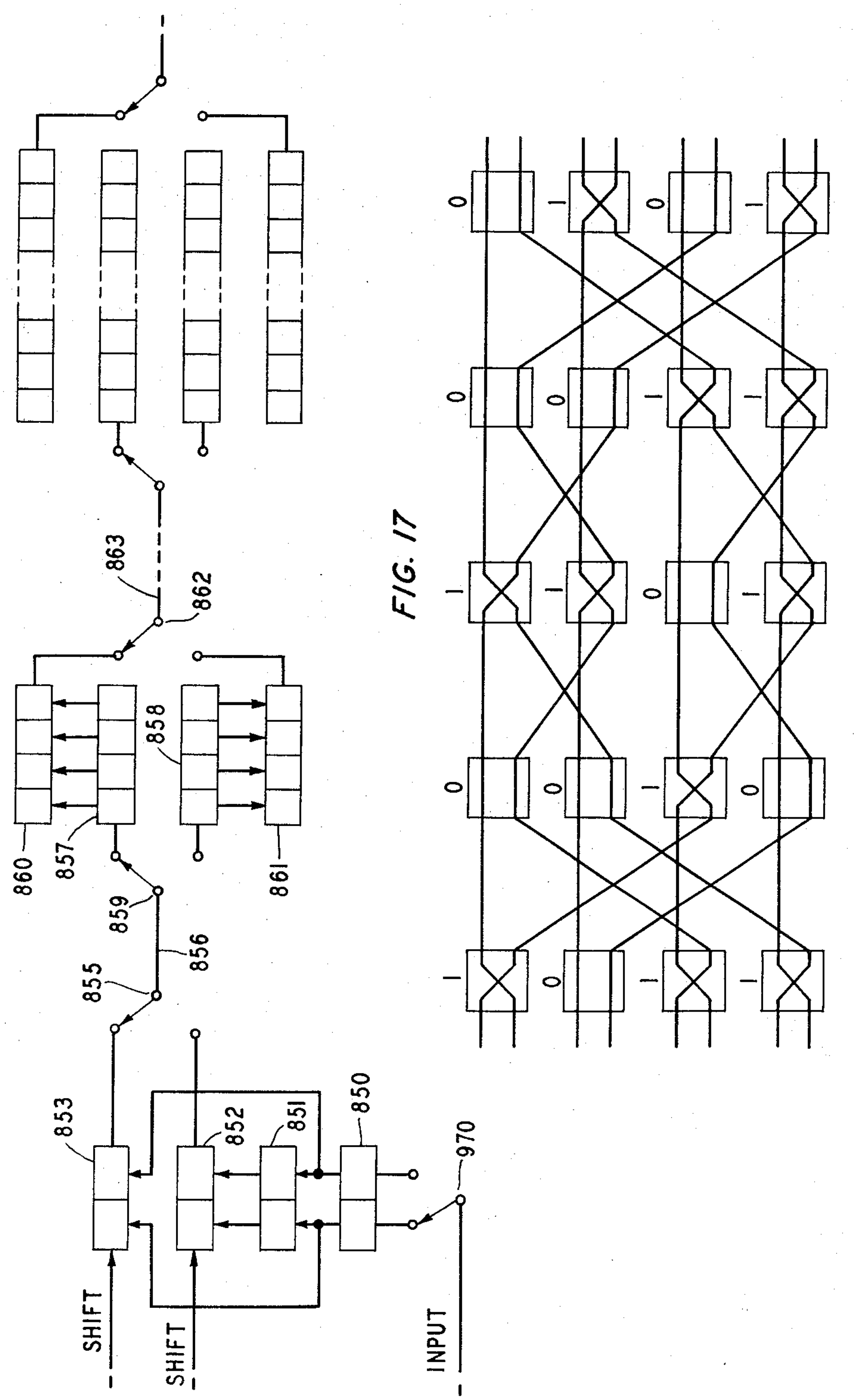
FIG. 16 shows an improved version of the circuit of FIG. 14 including sufficient buffering to permit pipelined operation.
FIG. 17 shows an array of $\beta$ elements which are useful for understanding a typical memory assignment algorithm.

A preferred embodiment of the present invention representing an improvement over the circuit of FIG. 14 is shown in FIG. 16. The arrangement of FIG. 16 includes buffering and other interconnection improvements to permit pipelined operation; i.e., partial time slot interchange is simultaneously provided at each stage.

In FIG. 16, stage 1 comprises four 2-bit registers 850–853. Pairs of input signals from consecutive input time slots are "sorted" by a network such as 970 in FIGS. 14, 15 into register 850 under the control of $N/2$-bits of control information. To simplify FIG. 16, the respective control memories are not explicitly shown. However, each of the control switches will be understood to be responsive in standard fashion during each frame to either a control sequence read from memory or a periodic clock pulse as will appear from the following description.

When register 850 contains two bits, its contents are transferred in parallel to register 851. Switch 970 then appropriately directs the next pair of input data elements to register 850. After a sequence of four bits has been thus stored in registers 850 and 851, the contents of register 850 are parallel transferred to register 853 while the contents of register 851 are parallel transferred to register 852. Registers 850 and 851 are then in a cleared condition and are available to receive the next sequence of 4 input data bits.

Meanwhile, data stored in registers 852 and 853 are merged in the sense described in connection with the operation of the circuit of FIG. 14. That is, data are selected from either register 852 or 853 in accordance with consecutive bits read from the memory controlling merging switch 855. Switch 855 typically comprises a pair of AND gates whose outputs are connected to an OR gate in the fashion of gates 809, 810 and 803 in FIG. 15. One of a double-ended version of the signal read from memory is then applied to an input of a respective one of the AND gates. The output of the right-hand cell of one of the registers 852, 853 are similarly connected to respective ones of the AND gates. After a bit is read from one of the registers 852, 853 the contents of the register are shifted one bit to the right.

The merged sequence appearing on lead 856 is then delivered to shift registers 857 and 858 under the control of switch 859. Switch 859 is substantially identical to switch 855 except that it is controlled not by the contents of a memory, but rather by a periodic square wave having a period of eight time slots (four time slots in the 1 state followed by four time slots in the 0 state). Thus a sequence of four bits is directed to register 857 followed by a sequence of four bits directed to register 858, and so forth. When consecutive four bit sequences have been stored by this procedure in shift registers 857 and 858, they are transferred in parallel to respective shift registers 860 and 861. This clears registers 857 and 858 to receive the next sequence of eight bits.

The contents of shift registers 860 and 861 are then merged under the control of switch 862 as directed by the contents of a corresponding $N$-bit memory. This merged output sequence of eight bits appears on lead 863.

The cascading of stages of the general form of stage 2 is repeated until a single merged sequence containing $N$-bits is obtained. Thus $\log_2 N - 1$ merging stages are required. Each of these stages comprises four registers containing at the $i$th stage $2^i$ bits. Also provided at the $i$th stage is a periodically alternating input switch like switch 859 having a semiperiod of $2^i$ time slots. An output merging switch for generating a single $(2^{i+1})$-bit sequence from two $(2^i)$-bit sequences in the manner of switch 862. This latter switch is under the control of the contents of an $N$-bit memory. Means are also provided to parallel transfer the contents of each of the first two of the registers to associated registers when the first two are full. Since each of the stages after the first requires $N$-bits of memory, the total memory requirement for the system of FIG. 16 is $N\log_2(N-1) + N/2 = N\log_2 N - N/2$.

A useful memory assignment algorithm for the networks of FIGS. 14–16 and an example illustrating this algorithm will now be given. At the first stage the input stream is treated in pairs. If the pair is correctly ordered, i.e., the bit destined for the earlier (lower order) output time slot occurs first in the input stream, a 1 signal is stored in memory 804 in the circuit of FIG. 15. This causes the contents of the right-hand cell in register 802 to be delivered to output lead 803 first. If the input pair is misordered, the correct memory signal is a 0.

Referring more particularly to the circuit of FIG. 16, it is noted that switch 855 must select for readout between the registers 851 and 852 the register having the lowest order time slot designation. Thus a comparison must be made between the destinations for data bits stored in registers 852 and 853.

TABLE II

| (1) T/S Assignment Input | (2) Output | (3) Stage 1 | (4) Memory Contents Stage 2 | (5) Stage 3 | (6) Stage 4 |
|---|---|---|---|---|---|
| 0 | 7 | | 0 | 1 | 1 |
| | | 0 | | | |
| 1 | 4 | | 1 | 0 | 1 |
| 2 | 5 | | 0 | 0 | 1 |
| | | 0 | | | |
| 3 | 0 | | 1 | 1 | 0 |
| 4 | 2 | | 0 | 1 | 1 |
| | | 1 | | | |
| 5 | 6 | | 1 | 0 | 1 |
| 6 | 8 | | 1 | 1 | 1 |
| | | 0 | | | |
| 7 | 1 | | 0 | 0 | 1 |
| 8 | 9 | | 0 | 1 | 1 |
| | | 1 | | | |
| 9 | 10 | | 1 | 1 | 0 |
| 10 | 15 | | 1 | 1 | 0 |
| | | 0 | | | |
| 11 | 3 | | 0 | 0 | 0 |
| 12 | 12 | | 0 | 0 | 0 |
| | | 1 | | | |
| 13 | 13 | | 1 | 0 | 0 |
| 14 | 14 | | 1 | 0 | 0 |
| | | 0 | | | |
| 15 | 11 | | 0 | 1 | 0 |

A useful technique for performing the required comparisons is to treat the desired time slots for the entire sequence of input time slots as a list to be sorted after the fashion of FIG. 13. If the sorting procedure illustrated in FIG. 13 be applied to the sequence of numbers specifying the desired (interchanged) time slots for consecutive input time slots as indicated in column (2) of table I, supra, the actual sorting process is accomplished as shown by the desired time slot numbers in the various cells.

To determine the required control information for switch 855 in FIG. 16 to accomplish the time slot interchange of table I (repeated in table II) then, reference is made to FIG. 13. There, it is seen, for example, that the two sequences $a_1 = (4, 7)$ and $a_2 = (0, 5)$ are to be merged to form $b_1$. For this purpose a selection must be made first from $a_2$, then from $a_1$, then from $a_2$ and finally from $a_1$. Thus a selection switch is considered to be switched down, up, down, and up in sequence; so it is in FIG. 16.

That is, since the second pair of input signals appears ultimately in register 852 (the lower register) the desired selection sequence is made by switching switch 855 in a down, up, down, up sequence. It proves convenient to associate a 1 with an "up" selection and a 0 with a "down" selection. Thus the first four bits of the required control information for switch 855 are (reading from left to right) 0101. The fact that this is an alternating pattern is merely coincidental.

By pursuing this analysis of the sorting of the input time slots in accordance with the desired respective output time slots, a pattern of selection (ups and downs) is derived with which is associated a corresponding pattern of control information. Since in FIG. 13 the sequences $a_3 = (2, 6)$ and $a_4 = (1, 8)$ are merged into $b_2 = (1, 2, 6, 8)$ by a down, up, up down selection pattern, bits 4–7 of the control information for switch 855 are seen to be 0110. A similar procedure is followed in merging lists $a_5$ and $a_6$ and $a_7$ and $a_8$. The control information derived is shown in column (3) of table II.

As mentioned above, no control information need be stored to control the up-down positioning of switch 859. Rather, an alternating four time-slot-duration 1 (up) signal is alternated with a 0 (down) signal of equal duration. The result is a bifurcation of the eight-bit sequence of merged, sorted pairs of signals appearing on lead 856. The contents of registers 860 and 861 in FIG. 16 therefore correspond to the sequences $b_1 = (0, 4, 5, 7)$ and $b_2 = (1, 2, 6, 8)$ in FIG. 13 after processing by the above-described selection process.

The merging of $b_1$ and $b_2$ to form $c_1$ in FIG. 13 is seen to involve an up, down, down, up, up, down, up, down selection sequence. Correspondingly, the first eight bits in the control sequence for selection switch 862 in FIG. 16 is seen to be 10011010 as shown at the top of column (4) in table II. The selection of list $c_2$ is then formed in the same manner; the resulting sequence of control information for the circuit of FIG. 16 is shown in the second half of column (4) in table II. The final selection performed at the fourth stage of the network of FIG. 16 is derived in the same manner and the results shown in column (5) in table II.

The contents of the local memories such as 706 in FIG. 9 are conveniently generated generally in accordance with the teachings of Waksman, "A Permutation Network," JACM, vol. 15, no. 1, Jan. 1968, pp. 159–163, or of Tsao-Wu and Opferman, "On Permutation Algorithms for Rearrangeable Switching Networks," Proceedings IEEE International Conference on Communications, June 1969, pp. 10–34.

The basic memory assignment technique involved requires the determining of the states for each of an array of $\beta$ elements of the type shown in FIG. 7 to perform a desired pattern of interconnections. When this is accomplished a pattern of 0's and 1's is associated with each column of the array. The pattern of 1's and 0's is then used as the required control information for a corresponding stage of the type shown in FIG. 9. That is, the pattern of 1's and 0's associated with the first column of the network of FIG. 7 is used to control the first stage of the type shown in FIG. 9, and so forth.

This process is best illustrated by reference to the example treated by Waksman supra, with certain minor modifications which are obvious in light of the above discussion. The required permutation is indicated in columns (1) and (2) in table III. The resulting network is shown in FIG. 17. By associating a 1 with a crossover and a 0 with a "straight through" connection of a $\beta$ element the contents of the memory at stages 1–5 of the form shown in FIG. 9 are indicated in columns (3)–(7) of table III.

TABLE III

| (1) Input T/S | (2) Output T/S | (3) Stage 1 | (4) Stage 2 | (5) Stage 3 | (6) Stage 4 | (7) Stage 5 |
|---|---|---|---|---|---|---|
| | | Contents of Local Memory | | | | |
| 1 | 2 | 1 | 0 | 1 | 0 | 0 |
| 2 | 7 | 0 | 0 | 1 | 0 | 1 |
| 3 | 6 | 1 | 1 | 0 | 1 | 0 |
| 4 | 8 | 1 | 0 | 1 | 1 | 1 |
| 5 | 4 | | | | | |
| 6 | 3 | | | | | |
| 7 | 1 | | | | | |
| 8 | 5 | | | | | |

It should be noted that to most efficiently cascade networks of the type shown in FIG. 9 the contents of the memory 706 at the $i$th stage (except the first stage) are read in sequence beginning at a time given by $$\sum_{i=1}^{k-1} d_i$$

where this sum is taken modulo $N$. This read out time is measured from the beginning of a frame.

Of course for many networks of each of the types described above, a table look-up scheme may be convenient for determining the required contents of the local memories at the respective stages. That is when a required permutation pattern is required reference may be made to a previously determined (calculated or empirically determined) pattern stored in a read-only memory. Appropriate subsets of this latter data are then entered into the respective local memories.

Table IV compares various of the characteristics of typical embodiments of the present invention described above. The left hand column indicates the circuit arrangement in each case, while the remaining columns detail the characteristics. In all cases logs are to be understood to be base 2 logs.

TABLE IV

| (1) Characteristics FIG. | (2) Minimum Delay | (3) Local Memory (Bits) | (4) Delay (Bits) | (5) Memory Controlled Switches | (6) Clock Controlled Switches |
|---|---|---|---|---|---|
| 2A | 0 | Nlog N | N − 1 | N − 1 | 0 |
| 9–11 | 2N − 4 | Nlog N − N/2 | 4N + 4log N − 4 | 2log N − 1 | 2log N − 2 |
| 16 | N | Nlog N − N/2 | 4N − 8 | log N | log N − 1 |

In general the last two embodiments (those of FIGS. 9–11 and 16) have less local memory and fewer switches at the expense of having greater minimum delay and more delay elements. The increased minimum delay is usually not a serious limitation in most applications. In technologies in which blocks of delay are inexpensive, the partitioning of the TSI into the last two designs may be desirable for economic reasons. Thus the advantages of each of these particular embodiments depend on the technology used for implementation.

Although the embodiments described all relate to time-division multiplex for signal representation, the same principles and practices are equally applicable to any orthogonal multiplex system, such as frequency-division and sequency-division.

Many of the principles and features of the present invention are applicable in other contexts. For example, the permuting of a data stream may be required in various computing contexts. The logic building blocks indicated above are all well-known and may assume different particular forms depending on desired operational speeds, desired logic levels and the like. The described embodiments of the present invention are intended to be merely typical. Numerous and varied variations within the spirit and scope of the appended claims will occur to those skilled in the art.

While the frames used for purposes of illustration have usually included a relatively small number of time slots, such as 8 or 16, the principles of the present invention are applicable to more practical frames including many hundreds or thousands of time slots. In fact, as can be seen by reference to table III, the advantages with regard to local memory size, etc. become even more important for large values of *N*. Similarly, although each time slot was assumed to include only a single bit, it is to be understood that practical time slots may include a signal byte including a plurality of bits.

While no specific form was shown for the various local memories, it should be understood that they are of standard form and typically comprise recirculating delay lines or random access arrays. It should also be understood that each of the local memories may conveniently form part of a single larger memory.

A useful variant of the memory assignment algorithm provided above in connection with the networks of FIGS. 9–11 may be used to improve security of communications channels. Thus by modifying memory contents in accordance with a pseudo-random sequence known only to approved system users it is possible to introduce a measure of time dependent scrambling into the time slot interchange procedure at one or more points along the common highway. By reversing the process at a subsequent time, the information sequence may be unscrambled. Meanwhile, perhaps while exposed to interception by nonapproved users, the data stream will appear incoherent, i.e., enciphered.

What is claimed is:

1. Apparatus for permuting the order of a sequence of *N* input signals comprising A. an ordered plurality of stages, each arranged to perform at least part of said permuting, each of said stages comprising
   1. a memory storing control signals partially indicative of said permuting,
   2. serial delay means comprising at least one delay element,
   3. a time division signal path having an input and an output, and
   4. means responsive to said control signals for selectively introducing said delay means into said signal path at at least one point between said input and said output, thereby to permute signals applied at said input to an extent indicated by said control signals, B. means for invariantly connecting the output of each stage except the last to the input of the immediately following stage, and C. means for applying said input signals at the input of the first of said ordered stages.

2. Apparatus according to claim 1 wherein said sequence of input signals comprises *N* bytes representing information in *N* consecutive input time slots, and wherein said delay means in at least one of said stages comprises an *N*-byte register for storing said N bytes in said input signals in an order determined by said control signals.

3. Apparatus according to claim 2 wherein said means for introducing said delay means comprises means for selecting among bytes in said *N*-byte sequence of input signals.

4. Apparatus according to claim 3 wherein said means for selecting comprises A. a plurality of AND gates, each having a plurality of input leads and one output lead, B. first input means for applying signals in said input sequence to each of said AND gates, C. second input means for applying control signals to each of said AND gates, thereby to enable signals in said input sequence to appear on selected ones of said output leads of said AND gates, and D. means for connecting said output leads of said AND gates to corresponding bytes of said N-byte register.

5. Apparatus for permuting the order of a sequence of *N* input signals comprising A. a memory storing control signals indicative of said permuting, B. an ordered plurality of stages, each comprising
   1. serial delay means comprising at least one delay element,
   2. a time division signal path having an input and an output, and
   3. first selecting means comprising means responsive to a subset of said control signals for selectively introducing said delay means into said signal path at at least one point between said input and said output, thereby to permute signals applied at said input to an extent indicated by said subset of said control signals, C. means for invariantly connecting the output of each stage except the last to the input of the immediately following stage, and D. means for applying said input signals at the input of the first of said ordered stages.

6. Apparatus according to claim 5 further comprising means for periodically reading said control signals from said memory and applying said control signals to said plurality of stages.

7. Apparatus according to claim 6 wherein said memory comprises a plurality of segments, each of said segments being arranged to store control signals associated with a corresponding one of said stages.

8. Apparatus according to claim 7 further comprising means for generating said control signals and means for applying to each of said segments generated control signals for controlling said corresponding one of said stages.

9. Apparatus according to claim 8 wherein said means for generating comprises a programmed data processor.

10. Apparatus according to claim 5 wherein in at least one of said stages A. said delay means comprises $k$ ordered shift registers, each of which comprises an input, $m$ bytes of storage, and an output, B. said first selecting means comprises means for distributing signals appearing at said input of said signal path to inputs of selected ones of said $k$ shift registers, further comprising C. a source of shift signals for periodically shifting the contents of said $k$ shift registers toward said outputs of said shift registers, and D. means for selectively delaying the signals appearing at the outputs of said $k$ shift registers.

11. Apparatus according to claim 10 wherein $k{\cdot}m=N$.

12. Apparatus according to claim 11 wherein $k=m=\sqrt{N}$.

13. Apparatus according to claim 10 wherein $k=2$.

14. Apparatus according to claim 13 wherein said means for selectively delaying comprises
A. first and second cascaded delay units each having an input and units of delay, and an output,
B. a switch alternately connecting the output of the second of said shift registers to the input of the first of said delay units and output of said second delay unit, and
C. means connecting the output of the first of said shift registers to the input of said second delay unit.

15. Apparatus according to claim 11 wherein said means for selectively delaying comprises $k-1$ ordered delay units connected in cascade, means connecting the output of the ith of said shift registers, $i=1, 2, 3, \ldots, k-1$, to the output of the ith of said ordered delay units, and means connecting the output of the kth of said shift registers to the input of the $(k-1)$th of said ordered delay units.

16. Apparatus according to claim 5 wherein said plurality of stages comprises two stages, and wherein at the second of said stages
A. said delay means comprises
1. a first register having $m$ bytes of storage,
2. a shift register having $m$ bytes of storage,
3. means for parallel transferring the contents of said first register to said shift register, and
4. means for shifting out the contents of said shift register, and
B. said first selecting means comprises means for distributing a subset of $m$ bytes of the signals appearing at the input of said signal path to selected ones of said $m$ bytes of said first register.

17. Apparatus according to claim 13 wherein said means for selectively delaying comprises means for merging the contents of both of said shift registers.

18. Apparatus according to claim 5 wherein in at least one of said stages said first selecting means comprises means for introducing said delay means in such manner as to sort a subset of the signals appearing at the input of said signal path.

19. Apparatus according to claim 18 wherein said first selecting means comprises means for sorting subsets comprising two consecutive signals appearing at said input of said signal path.

20. Apparatus according to claim 18 wherein in at least another of said stages
A. said delay means comprises $k$ ordered shift registers, each of which comprises an input and an output,
B. said first selecting means comprises means for directing signals appearing at said input of said signal path to inputs of selected ones of said $k$ shift registers, further comprising
C. means for selectively delaying the signals appearing at the outputs of said $k$ shift registers.

21. Apparatus according to claim 20 wherein $k=2$ and said means for selectively delaying comprises means for merging the signals appearing at the outputs of said two shift registers.

* * * * *